| United States Patent [19] | [11] Patent Number: 5,074,767 |
|---|---|
| Gerlach et al. | [45] Date of Patent: Dec. 24, 1991 |

[54] POSITIVE DISPLACEMENT PUMP WITH ROTATING RECIPROCATING PISTON AND IMPROVED LUBRICATION FEATURE

[75] Inventors: C. Richard Gerlach; Edgar C. Schroeder, both of San Antonio, Tex.

[73] Assignee: Hypro Corporation, New Brighton, Minn.

[21] Appl. No.: 602,803

[22] Filed: Oct. 24, 1990

[51] Int. Cl.[5] .............................................. F04B 7/06
[52] U.S. Cl. .................................................... 417/500
[58] Field of Search ...................... 464/12, 15; 417/500

[56] References Cited

U.S. PATENT DOCUMENTS

| 1,244,160 | 10/1917 | Anderson | 91/233 |
|---|---|---|---|
| 1,501,758 | 7/1924 | Drees | 417/500 |
| 1,863,365 | 6/1932 | Deschamps | 464/12 |
| 2,239,723 | 4/1941 | Limpert et al. | 417/419 |
| 2,517,645 | 8/1950 | Erikson | 417/500 |
| 2,875,599 | 3/1959 | Gregory | 464/15 |
| 3,168,872 | 2/1965 | Pinkerton | 417/492 |
| 3,382,812 | 5/1968 | Smith | 417/500 |
| 4,008,003 | 5/1977 | Pinkerton | 417/250 |
| 4,536,140 | 8/1985 | Guthrie | 417/500 |
| 4,575,317 | 3/1986 | Lindner | 417/500 |
| 4,708,605 | 11/1987 | Orlita | 417/500 |
| 4,863,358 | 9/1989 | Lindner | 417/500 |

*Primary Examiner*—Richard A. Bertsch
*Assistant Examiner*—Charles Freay
*Attorney, Agent, or Firm*—Haugen and Nikolai

[57] ABSTRACT

A positive displacement pump especially designed for home use comprises a crankcase housing and a cylinder block joined thereto, the cylinder block containing a cylindrical bore whose longitudinal axis is at a predetermined angle relative to the longitudinal axis of the pump's drive shaft journaled in the crankcase housing. A piston having a central longitudinal bore formed inward from one end thereof and which includes a timing window extending through its side surface, is fitted into the cylindrical bore and coupled to the drive shaft by a pin which is journaled in a spherical bearing. A suction port is formed through the wall of the cylinder block on one side surface thereof and on the opposite side surface, 180° away, is a high pressure discharge port. When the pump is driven, the piston both rotates and reciprocates causing the timing window in the piston to sweep by the inlet or suction port where a charge of liquid at low pressure is allowed to enter the hollow piston. As the piston rotates, the timing window moves to a point where it is ultimately in line with the discharge port when the piston is at a top dead center position. By canting the pin of the piston relative to its longitudinal axis compensation for the unequal hydraulic forces acting in the transverse direction on the piston results. An improved lubrication system incorporating grease as the lubricant is also employed.

5 Claims, 1 Drawing Sheet

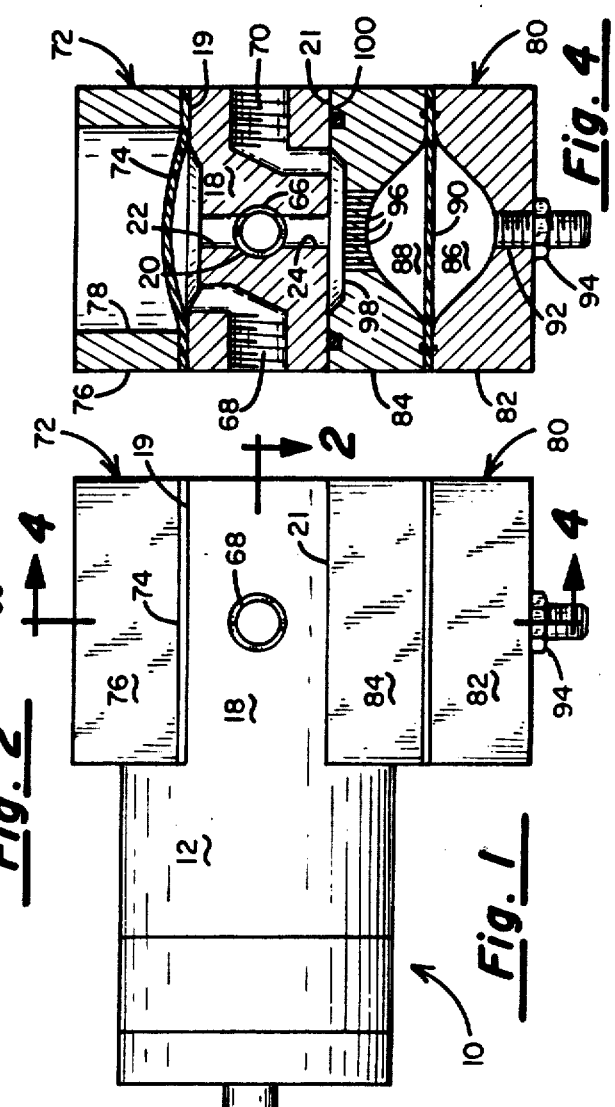
Fig. 2
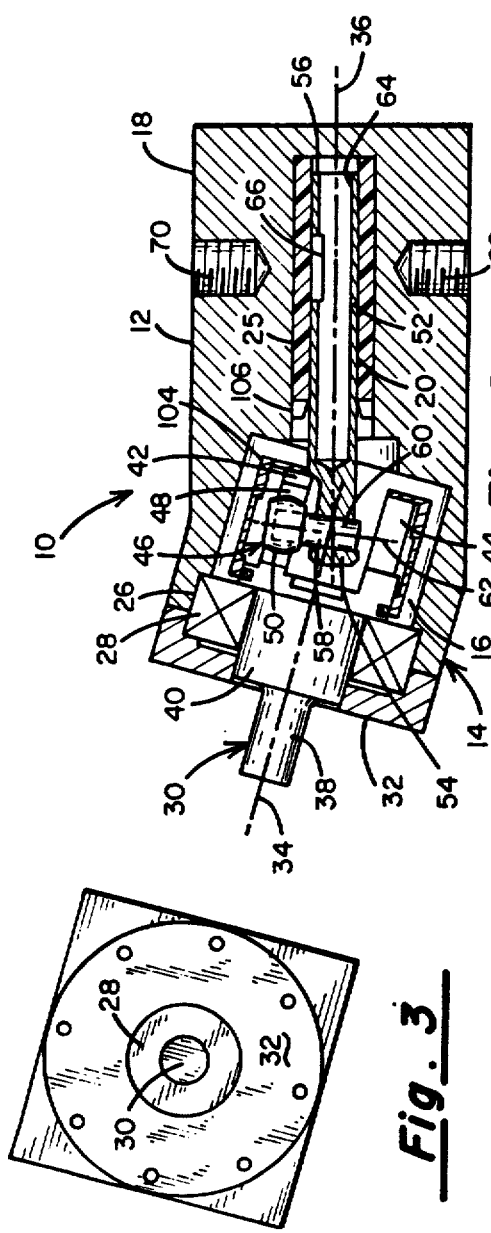
Fig. 1
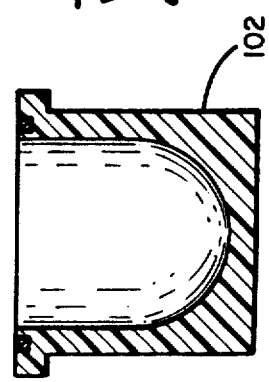
Fig. 3
Fig. 4
Fig. 5

POSITIVE DISPLACEMENT PUMP WITH ROTATING RECIPROCATING PISTON AND IMPROVED LUBRICATION FEATURE

BACKGROUND OF THE INVENTION

I. Field of the Invention

This invention relates generally to fluid handling equipment, and more particularly to an improved, low-cost positive displacement pump especially designed for residential high-pressure washing applications.

II. Discussion of the Prior Art

Generally speaking, most municipalities deliver water to residential establishments at a pressure of about 60 psi. Such pressure is oftentimes insufficient for such applications as automobile washing, garage floor and driveway cleanup, removing the flaking paint from building sidings and similar applications. End-uses like this require that water be delivered at relatively high pressures and at acceptable flow rates such that the momentum of the water striking the surface to be cleaned will be effective to dislodge the dirt, grease and grime to be removed. It has been found that a pump delivering water at about 1,000 psi and at a flow rate of two gallons/minute is satisfactory for most residential pressure washing applications.

A wide variety of positive displacement pump devices are available which will meet such requirements. Single or multiple piston pumps, when driven by an electric motor or internal combustion engine can readily meet the pressure and flow rate requirements. However, such pumps, in the past, have tended to be relatively heavy, fairly complex and, therefore, relatively expensive, making it difficult to sell to average homeowners.

For example, applicant's assignee, Hypro Corporation of St. Paul, Minn., offers a line of single and of multiple piston positive displacement pumps of the type including a crankcase, a cylinder block affixed to the crankcase, a shaft journaled for rotation in the crankcase having one or more eccentrics and coupled by an appropriate number of connecting rods to the piston which is mounted for reciprocal movement within a cylinder bore formed in the cylinder block. Pumps of this type also require suitable inlet and outlet poppet valves as well as appropriate seals operatively disposed between the cylinder walls and the piston to prevent the liquid being pumped from entering the crankcase and for effectively isolating the low pressure or suction port from the high pressure discharge port.

To meet the average residential consumer demand for a relatively low cost, light-weight pump for high pressure washing applications around the home and farm, Hypro Corporation engaged the Southwest Research Institute in San Antonio, Tex., to develop a pump for home use which would meet prescribed and rather stringent specifications in terms of cost and performance. Rather than attempting to cost reduce existing pump designs developed for commercial and industrial applications so that the resulting product could be more readily marketed to the general consumer, it was decided instead to adapt a particular type of pump that heretofore had been used primarily as a metering pump, i.e., a pump for introducing a measured quantity of a liquid from a supply reservoir into a fluid stream, into one suitable for high pressure washing applications.

The prior art metering pump comprises a crankcase for journaling a driven shaft about a longitudinal axis and a cylinder block having a cylinder receiving bore formed therein with the cylinder block being affixed to the crankcase housing such that the axis of the driven shaft is at a predetermined angle relative to the longitudinal axis of the cylinder bore. A cylindrical piston is disposed in the cylinder bore and is affixed to the driven shaft by means of a connecting pin and a spherical bearing. Because of the angle at which the axis of the piston is out of alignment with the axis of the driven shaft, as the driven shaft is rotated, the piston both rotates and reciprocates within the cylinder. A suction port is formed through the cylinder block on one side surface thereof while the discharge port is located on a diametrically opposite surface of the cylinder block. The piston is appropriately formed to provide a pocket which sweeps past the suction port to thereby pick up a charge of water and then as the piston rotates toward the discharge port, the reciprocating motion of the piston increases the pressure on the fluid until the pocket becomes exposed to the discharge port. Such a pump design offers the advantage of obviating the need for inlet and outlet flow control valves.

Examples of the prior art rotating/reciprocating piston-type pump are described in U.S. Pat. Nos. 3,168,872; 2,517,645 and 1,244,160. Such pumps have typically been designed to operate at low flow rates and relatively low pressures which, while satisfactory for metering applications, are wholly insufficient for a portable, high pressure spray wash application. To achieve adequate flow rates for high pressure washing, it is desirable to drive the pump at relatively high RPM, e.g., about 10,000 rpm. Likewise, to achieve a pump discharge pressure of about 1,000 psi, a prime mover of at least 1.5 horsepower is dictated. Keeping in mind that size, weight and cost are important constraints, there are stringent limitations imposed on the pump's stroke volume and, hence, the need for operating at high rpm. The high discharge pressure desired coupled with the relatively small pump size and the inherent imbalance of forces acting on the piston as it rotates to alternately expose and block the suction and discharge ports presents a real problem in maintaining the piston centered within the cylinder so as to avoid scraping and galling of the walls of the cylinder bore and of the piston itself. Likewise, the unbalanced pressures makes it somewhat difficult to create seals which will hold up over long periods of use.

Another problem encountered when it is desired to operate a prior art pump of the type disclosed in the aforereferenced patents at high rpm rates is that of maintaining adequate lubrication of the bearing used to operatively couple the piston to the pump's driven shaft. The conventional mode of lubrication for a metering pump operated at relatively low rpm rates is to fill the crankcase housing with oil and then provide adequate seals between the cylinder wall and the piston to insure that the liquid being pumped does not flow into the crankcase to contaminate the oil. It is found that when this lubrication approach is attempted in a positive displacement pump of the type under consideration driven at 10,000 rpm, a significant loss in pump efficiency results due to the work involved in moving and churning the oil within its crankcase. Also, with the high pressures desired, the difficulty in providing an effective oil seal which will hold up over prolonged periods of use is difficult and expensive to attain. At high rpm and pressures typical of the present invention, pressure pulsations may cause problems because of excess stresses in the pump or attached hose and excess noise.

OBJECTS

It is accordingly a principal object of the present invention to provide an improved positive displacement pump of the type having a rotary and reciprocating piston for use in high pressure/high flow rate applications.

Another object of the invention is to provide a positive displacement pump of the type described in which the unbalanced side forces acting on the piston in prior art reciprocating/rotary piston pumps are effectively neutralized.

Still another objective of the present invention is to provide effective means for pulsation suppression.

A still further object of the invention is to provide a positive displacement pump of the type described with an improved lubrication system allowing less expensive lubrication seals to be used while simultaneously reducing the work or energy involved in moving the lubricant.

SUMMARY OF THE INVENTION

The foregoing objects and advantages of the invention are achieved by providing a pump housing which includes a crankcase defining a hollow chamber and a contiguously disposed cylinder block. The cylinder block includes a longitudinal cylindrical bore of a predetermined diameter and a pair of oppositely oriented ports which extend laterally through the block to communicate with the cylindrical bore. A shaft is journaled for rotation in the crankcase where the shaft includes a central axis which is at a first predetermined angle to the central axis of the cylindrical bore formed in the cylinder block. The shaft supports a spherical bearing within the hollow crankcase chamber and it is offset radially from the central axis of the shaft. An elongated cylindrical piston having a pin member extending laterally from a side surface thereof proximate a first end is arranged to fit into the cylindrical bore in the cylinder block when the pin on the piston is journaled for rotation in the spherical bearing. The laterally extending pin is canted from the perpendicular relative to the longitudinal axis of the piston and this serves to eliminate pin loading induced side forces on the piston. The piston also includes a longitudinal bore extending inwardly from the second end thereof and it has a timing window formed through its surface at a location which is between the first and second ends and which communicates with the longitudinal bore in the piston. The timing window is so located that it is swept passed the oppositely oriented ports formed through the cylinder block when the shaft is rotated.

Disposed within the crankcase and surrounding the spherical bearing is a lubrication cup which is affixed to the shaft and therefore rotatable with it. The cup contains a lubricant of high viscosity, e.g., a grease, and when the shaft rotates at high speed, centrifugal force causes the grease to impinge on the spherical bearing and is contained within the lubrication cup obviating the need for the type of oil seals that are otherwise required.

Pulsation dampeners may be affixed to the cylinder block in a position to overlie the discharge port for reducing the pressure surges in the water leaving the exit port. A second pulsation dampener may also be affixed to the cylinder block in overlaying relation relative to the suction port. In either event, the pulsation dampeners are designed so as to be closely coupled to their respective port, thus reducing the fluid inertance of the system.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

FIG. 1 is a side elevation of the positive displacement pump comprising the preferred embodiment of the invention;

FIG. 2 is a cross-sectional view taken along the line 2—2 in FIG. 1;

FIG. 3 is an end-view of the drive shaft end of the pump assembly of FIG. 1;

FIG. 4 is a cross-sectional view taken along the line 4—4 in FIG. 1; and

FIG. 5 illustrates an alternative design for a pulsation dampener to be used with the pump arrangement of FIG. 1.

DESCRIPTION OF THE PREFERRED EMBODIMENT

With reference to FIGS. 1 and 2 of the drawings, the pump of the present invention is indicated generally by numeral 10 and is seen to include a housing 12 of generally rectangular cross-section and which may be formed from a metal such as aluminum or a suitable plastic such as a glass-filled polypropylene of the type sold by the Dupont Corporation under the trademark, Rynite ®. A glass-filled Nylon ® plastic may also be used. One such material is GRZ, which is the acronym for Glass Reinforced Zytel ®. Depending upon the material employed, the block 12 is either molded or machined to include a crankcase section 14 which includes a hollow chamber 16 and a contiguously disposed cylinder block segment 18. The cylinder block 18 includes a longitudinal cylindrical bore 20 of a predetermined diameter and extending through the wall of the cylinder block so as to communicate with the bore are a pair of oppositely oriented ports including a suction portion 22 and a discharge port 24. If the cylinder block is fabricated from cast aluminum, a tubular plastic piston sleeve 25 is recommended for inclusion in the bore 20. However, if the cylinder block is formed from plastic, a separate sleeve may not be required.

Fitted into an annular recess formed in the crankcase 14 is a set of bearings 28 for journaling a shaft 30 therein. An end cap 32 is bolted to the end of the crankcase 14 to capture the bearing 28 in position. Alternatively, a spring clip or other means may be used to hold the bearing in place. The centerline of the shaft 30 is identified by numeral 34 and it is designed to intersect at a predetermined acute angle with the centerline 36 of the cylindrical bore.

The shaft 30 is seen to include a cylindrical segment 38 which projects outwardly from the clamping ring 32 and which is adapted to be coupled to a prime mover, such as an electric motor or an internal combustion engine. The segment 38 is integrally formed with a cylindrical segment 40 of a larger diameter which is surrounded by and journaled in the bearing 28. Integrally formed with the segment 40 are a plurality of lugs, as at 42 and 44, which effectively surround a socket formed in the portion of the shaft 30 contained within the crankcase chamber 16. Fitted into a circular aperture formed in the lug 42 is a spherical bearing assembly 46 which includes a stationary race 48 and a toroidal member 50 having a spherical outer surface cooperating with the race 48.

As best seen in FIG. 2, fitted into the sleeve 25 in the cylindrical longitudinal bore 20 formed in the cylinder block 18 is a piston 52 having a first end 54 disposed in the socket defined by the lugs 42, 44, etc. of the shaft 30 and a second end 56 located proximate the top dead center position of the cylinder block 18. The piston is preferably made from Type 17-4PH stainless steel which has high strength and harness properties. A cylindrical pin 58 is press-fit into a radial bore 60 formed through the end portion 54 of the piston 52. It is to be especially noted that the centerline 62 of the pin 58 is not perpendicular to the centerline 36 of the cylinder 20 or that of the piston 52 but instead is canted at a predetermined angle relative to the longitudinal axis of the piston and cylinder. For reasons which will be explained hereinbelow, the angle at which the pin 58 is canted from the perpendicular is determined by the working radius of the pump, which is the distance between the center of the spherical bearing 46 and the centerline 36 of the cylindrical bore 20. The angle in question is such that a line perpendicular to the pin 58 drawn from the center of spherical bearing 46 intersects the centerline of the piston at its end 56. In this situation, the pin loading induced side forces exerted on the piston are eliminated over the entire range of rotation of the piston within the longitudinal cylindrical bore 20, thus obviating the need for balancing ports or other means for constraining the tendency of the piston to move laterally.

The piston 52 includes a longitudinal bore 64 which extends inwardly from the end 56 thereof such that over its working length, the piston 52 can be considered as being tubular. Extending through the side wall of the tubular piston 52 so as to communicate with the central bore 64 is a timing window 66. It is aligned on the same side of the piston as the projecting portion of the pin 58.

Because the timing window is displaced longitudinally from the end 56 of the piston a cylindrical surface is present on either side of the window to provide a bearing surface with respect to the tubular sleeve 25 on both sides of the window. The pin 58 is journaled within the central opening of the toroidal spherical bearing 46 as illustrated. Those skilled in the art will appreciate that when the shaft 30 is rotated, the piston 52 will also rotate within the cylinder bore 20 and will simultaneously move in longitudinal reciprocal fashion.

With reference now to FIGS. 1 and 4, an inlet port 68 is provided in the cylinder block 18 whereby a connection can be made between a low pressure water source and the pump. Likewise, on the opposite side of the cylinder block is a discharge port 70 through which the high pressure output from the pump is made to pass.

Bolted or otherwise affixed to the side surface 19 of the cylinder block 18 is an inlet or suction side pulsation dampener comprising an elastomeric sheet 74 and a generally rectangular frame member 76 defining an opening 78 through the thickness dimension thereof. When the pulsation dampener 72 is affixed to the side surface 19 of the pump, the elastomeric sheet 74 overlays the pump's water inlet port 68 as well as its suction port 22. Being distendable, as water under nominal household pressure is introduced into the inlet port 68, the elastomeric sheet 74 is distended into the opening 78 in the frame 76 allowing the water to flow into the pump's suction port 22 when the window 66 of the piston is in fluid communication with that port during its cycle of rotation.

In a somewhat similar fashion, a discharge port pulsation dampener 80 is operatively associated with the pump's high pressure outlet port 70 and its discharge port 24. In accordance with the embodiment illustrated in FIGS. 1 through 4, the high pressure pulsation dampener 80 comprises first and second rectangular blocks 82 and 84 each having an arcuate cavity as at 86 and 88 formed in apposed surfaces thereof. Sandwiched between the blocks 82 and 84 is fiber reinforced elastomeric sheet 90 which effectively separates the chambers 86 and 88 from one another. Fitted into a threaded bore 92 formed through the plate 82 is a one-way gas valve 94 which permits a gas, such as nitrogen, under pressure, to be introduced into the chamber 86. When inflated to an operating pressure of about 500 psi, the sheet 90 is forced against the arcuate wall of the cavity 88 through which a pattern of small apertures as at 96 are formed. With continued reference to FIG. 4, it can be seen that the plate 84 is recessed, as indicated by numeral 98, so that when the surface 100 of the plate 84 is juxtaposed with the wall surface 21 of the cylinder block 18, a cavity is formed which overlays the pump's high pressure discharge port 24 and its outlet port 70. The suction and discharge pulsation dampeners serve to eliminate the need for excessive input power to drive the pump and also act to reduce peak forces on bearings, the drive pin and the piston.

As will be explained more fully hereinbelow, when the shaft 30 is driven, the piston 52 both rotates and translates reciprocally in the longitudinal bore 20. When the window 66 sweeps past the pump's inlet port 22 which allows the interior cavity of the piston to fill with water, the rotation will reach a point where the timing window is effectively sealed by the close tolerance between the piston wall and the associated cylinder wall or sleeve. During this interval, the piston moves in its longitudinal direction (to the right when the pump is oriented as shown in FIG. 2) exerting increasing compressive forces on the liquid. As the window 66 in the piston reaches and sweeps across the discharge port 24, the water is discharged under high pressure, first through the series of ports 96 and against the pressurized sheet 90 and, thence, out those same ports 96 and the pump's outlet port 70. The compliance of the sheet 90 and the pressurized gas in the chamber 86 tends to damp out pressure surges as the pump's piston is driven at high rpm.

By canting the pin 58 at a predetermined angle from the perpendicular to the piston, the direction of force applied to the piston becomes generally concentric with the centerline thereof and, as a result, pin loading induced side forces on the piston are eliminated throughout the entire range of motion of the piston. Moreover, it is now possible to locate the timing window 66 on the same side of the piston as the pin 58 extends from and this has the advantage of placing the piston material surrounding the window in compression to thereby eliminate the tendency for any cracking to occur at the window corners. This affords the further advantage of allowing a reduction in the wall thickness of the piston without incurring such cracking. Of course, a lighter piston results in a significant reduction in the inertia of the piston when it is driven at 8,000-10,000 rpm. The degree to which the pin is canted to the perpendicular to the piston axis is a function of both piston length and the working radius of the spherical bearing.

As is illustrated in the view of FIG. 5, in accordance with another embodiment, the high pressure discharge pulsation dampener 80 of FIG. 4 may be replaced with a molded plastic dome-like member 102. The dome 102 is preferably molded from a high strength, low modulus plastic. There are certain Nylon formulations exhibiting an elastic modulus of about 100,000 psi and a tensile strength of 16,000 psi. That material, when properly, dimensioned in terms of length and cross-sectional area, results in a pulsation dampener with relatively low inertance. Moreover, because the pump of the present invention is intended to operate at relatively high RPM, the acoustic wavelength of the pressure pulsations is very short which necessitates a short coupling between the pulsation dampener and the pump's suction and discharge ports.

With reference again to FIG. 2, there is identified by numeral 104 a cup which is dimensioned to snap onto the lugs 42, 44, etc. of the shaft 30 so as to effectively surround the lugs, the spherical bearing assembly 46 and the pin 58 which fits into that spherical bearing. With that cup in place, a small quantity of a thick, viscous lubricant, such as grease, may be deposited within the cavity formed in the inner end of shaft 30. When the shaft 30 is driven at high speed, centrifugal forces act on the grease to propel it radially outward where it becomes contained by the cup 104 with very little of the grease exiting the opening formed in the cup 104 through which the end 54 of the piston extends. The forces acting on the grease cause it to seep into the spherical bearing, thus lubricating it and the pin contained in the bearing. Whereas prior art pumps of the rotating and reciprocating piston-type have typically been lubricated by filling the cavity 16 with oil, the use of the cup 104 which allows grease to be used as the lubricant has been found to materially reduce energy losses which, in the prior art, can be attributable to the churning of the oil within the cavity 16. In addition, because the lubrication cup 104 effectively contains the grease lubricant, it becomes unnecessary to provide an oil seal surrounding the piston at the intersection of the crankcase segment 14 with the cylinder block 12. Instead, only a single cup seal as at 106 is needed to preclude the flow of the liquid being pumped to the interior of the crankcase chamber 16. Moreover, it has been found unnecessary to provide an oil seal around the shaft 38 where it extends out through the retaining collar 32.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A fluid pump comprising:
   (a) a housing including a crankcase defining a hollow chamber and a contiguously disposed cylinder block having a longitudinal cylinder bore of a predetermined diameter;
   (b) a drive shaft journaled for rotating in the crankcase, the central axis of the shaft being at a predetermined angle to the central axis of the cylinder bore with the shaft supporting a spherical bearing within said hollow chamber at a location offset radially from the central axis of the shaft;
   (c) a generally cylindrical cup member having a first open end and a second end having a central opening therein, said cup member surrounding said spherical bearing and affixed to a portion of the shaft disposed within the hollow chamber for retaining an effective quantity of a sufficiently viscous grease to provide lubrication to said spherical bearing when said drive shaft is driven at its operating speed without loss of said grease through said first open end and said central opening; and
   (d) an elongated cylindrical piston having first and second ends and a pin extending laterally from a side surface thereof proximate said first end, said pin being journaled in the spherical bearing when the piston extends through the central opening in the second end of the cup member and into the longitudinal cylindrical bore of the cylinder block.

2. The fluid pump as in claim 1 wherein when said shaft is rotated at high speeds to drive said piston, said cup member retains lubricating grease in a zone traversed by said spherical bearing.

3. The fluid pump as in claim 2 wherein said first end of the cup member clamps onto said portion of the shaft disposed within the hollow chamber and rotates with the shaft.

4. The fluid pump as in claim 2 wherein said lubricating grease is sufficiently viscous to resist flow when said shaft is stationary but flows when acted upon by a predetermined centrifugal force.

5. The fluid pump as in claim 1 wherein said portion of said shaft contained within said hollow chamber includes an arcuate wall having a circular aperture therein for receiving said spherical bearing, said cup member concentrically surrounding said arcuate wall.

* * * * *